(12) United States Patent
Carminati et al.

(10) Patent No.: US 6,632,777 B1
(45) Date of Patent: Oct. 14, 2003

(54) DRILLING FLUIDS COMPRISING OIL EMULSIONS IN WATER

(75) Inventors: Stefano Carminati, Monza (IT); Alberto Guarneri, Casalbuttano (IT); Marco Brignoli, Brugherio (IT)

(73) Assignees: ENI S.p.A., Rome (IT); Enitecnologie S.p.A, San Donato (IT)

( * ) Notice: Subject to any disclaimer, the term of this patent is extended or adjusted under 35 U.S.C. 154(b) by 116 days.

(21) Appl. No.: 09/721,765

(22) Filed: Nov. 27, 2000

(30) Foreign Application Priority Data

Nov. 26, 1999 (IT) .......................... MI99 A 2475

(51) Int. Cl.[7] .................................. C09K 7/02
(52) U.S. Cl. .................... 507/136; 507/138; 507/103; 175/72
(58) Field of Search ................... 507/103, 110, 507/136, 138; 175/72

(56) References Cited

U.S. PATENT DOCUMENTS

| | | | | |
|---|---|---|---|---|
| 2,805,722 A | * | 9/1957 | Morgan et al. | 507/110 |
| 3,150,085 A | * | 9/1964 | Mallory | 507/136 |
| 3,710,865 A | * | 1/1973 | Kiel | 507/103 |
| 3,852,234 A | * | 12/1974 | Venema | 507/103 |
| 4,411,801 A | * | 10/1983 | Pomerleau | 507/136 |
| 5,007,489 A | * | 4/1991 | Enright | 507/136 |
| H1000 H | | 12/1991 | Patel et al. | |
| 5,783,525 A | | 7/1998 | Blanco et al. | |

FOREIGN PATENT DOCUMENTS

| | | |
|---|---|---|
| WO | WO 95/09900 | 4/1995 |
| WO | WO 98/18882 | 5/1998 |

* cited by examiner

*Primary Examiner*—Philip Tucker
(74) *Attorney, Agent, or Firm*—Oblon, Spivak, McClelland, Maier & Neustadt, P.C.

(57) ABSTRACT

Composition of water-based drilling fluids characterized in that they comprise an oil in water emulsion.

12 Claims, 2 Drawing Sheets

DRILLING FLUIDS COMPRISING OIL EMULSIONS IN WATER

Figure 1:
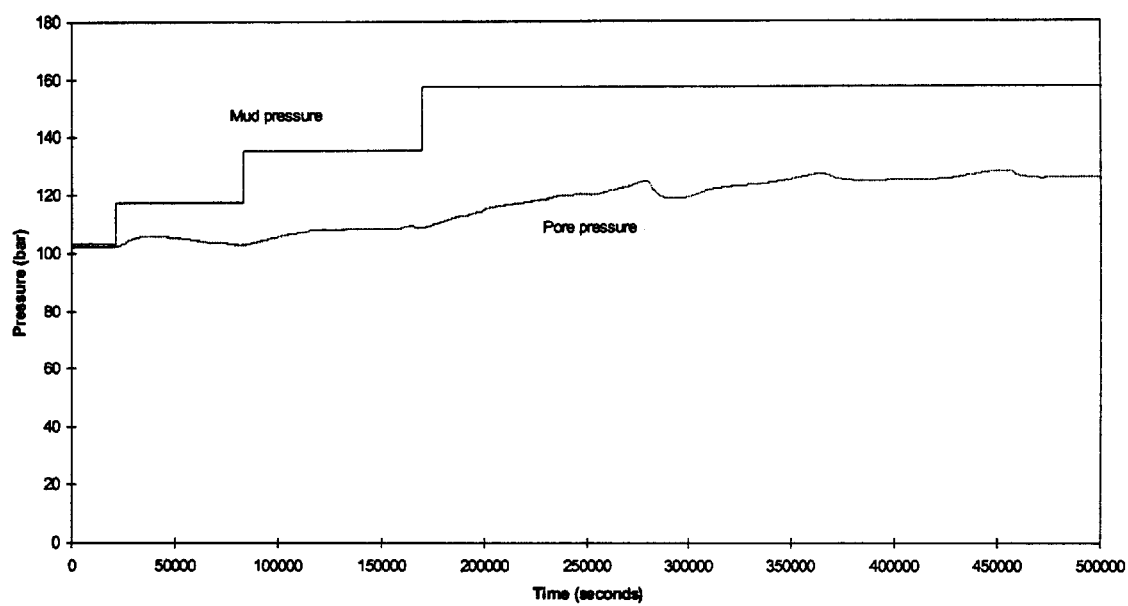

The present invention relates to drilling fluids comprising oil in water emulsions.

In the drilling of oil wells with water-based fluids, instability problems arising in shales must be frequently solved. These are due to two main factors: 1) the reactivity of claystone to water and 2) the transmission of the pressure from the mud column to the inside of the formation which modifies the stress within the rock causing it to break.

With respect to the second point (formulations which prevent pressure transmission from the mud column to the formation), two procedures are adopted:

2a) blocking the micropores of the shales, by means of inorganic salts which precipitate when they come into contact with the formation water [Clark, D. E. and Benaissa, S.: "Aluminium Chemistry Provides Increased Shale Stability with Environmental Acceptability", paper SPE 25312 presented at the 1993 SPE Asia Pacific Oil and Gas Conference and Exhibition, Feb. 8–10]; [Felixberger, J.: "Mixed Metal Hydroxide (MMH). A novel and unique inorganic viscosifier for drilling fluids". Ed. Royal Society of Chemistry, 1994]; [van Oort, E.: "A novel technique for the investigation of drilling fluid induced borehole instability in shales", Eurock'94, Balkema, Rotterdam, 1994, pages 293–308] or with micro-drops of a phase immiscible in water which may be a polymer with Cloud Point [Bland, R.G., Smith, G.L. and Eagark, P.: "Low Salinity Polyglycol Water-Based Drilling Fluids as Alternatives to Oil-Based Muds", paper SPE/IADC 29378, presented at the 1995 SPE/IADC Drilling Conference, Amsterdam, The Netherlands, February 28–March, 2];

2b) preparing drilling fluids with high concentrations of salt (sodium, potassium or calcium salts) in order to extract the formation water from the clay layers as a result of osmotic effect [O'Brien, D. E. and Chenevert, M.: "Stabilizing Sensitive Shales with Inhibited, Potassium-Based Drilling Fluids", JPT, (September, 1973), 1089–1100]. In this way the pressure of the formation water is reduced and the stability of the well walls improved [van Oort, E., Hale, A. H. and Mody, F. K.: "Manipulation of Coupled Osmotic Flows for Stabilisation of Shales Exposed to Water-Based Drilling Fluids", paper SPE 30499 presented at the 1995 SPE Annual Technical Conference and Exhibition, Dallas, Tex., U.S.A., October, 22–25].

All these processes of the prior art however have the disadvantage of not being very effective.

A composition of drilling fluids has now been found, which is particularly effective in preventing pressure transmission from the mud column to the formation.

In accordance with this, the present invention relates to a composition of water-based drilling fluids characterized in that they comprise an oil in water emulsion. In the preferred embodiment, a non-ionic emulsifying agent is used, with an HLB ranging from 8 to 15, preferably polyoxyethylene-sorbitan mono-oleate.

The emulsion comprises (a) an oil insoluble in water, essentially hydrocarbon, optionally containing heteroatoms, preferably paraffinic, in a quantity ranging from 5 to 25% by weight, preferably from 8 to 15% by weight, (b) a nonionic surface-active agent in a quantity ranging from 2 to 10% by weight, preferably from 3 to 7% by weight, the complement to 100 being water. The emulsion may optionally also contain inorganic salts for example potassium chloride.

As is known to experts in the field, the composition of drilling fluids of the present invention may comprise other additives, such as viscosifiers, pH regulators, biocides, lubricants, filtrate reducers.

further object of the present invention relates to a process for blocking the micropores of shales by means of a drilling fluid, characterized in that the fluid comprises an oil in water emulsion.

The pressure transmission test (PTT), which is briefly described below, is used to verify the capacity of this fluid to prevent pressure transmission from the mud column to the formation.

Pressure Transmission Test

The sample of claystone is inserted in a rubber sheath, closed at the ends by two steel heads and is placed in the cell where it is pressurized and heated. The two heads are connected to two independent hydraulic circuits which operate under high pressure conditions; one of these (mud circuit which simulates the drilling well with mud) is an open circuit where a solution (which can be pore water or a drilling fluid) is pumped and laps against one of the two sides of the cylindrical sample. The pressure of the mud is kept constant by a "back pressure regulator"; the volume of the part of the circuit under pressure during the test is 22 cc. A piezoresistive transducer continuously measures the internal pressure of the circuit, just before the fluid enters the cell. The other circuit (pore circuit which simulates the shale) has an internal volume of 22 cc, with an additional tank of 38 cc for a total of 60 cc. This contains a fluid having a composition similar to the pore fluid whose pressure is measured by a piezoresistive transducer. A computer records the cell temperature (T), the pressure of the pore circuit (Ppore) and of the mud circuit (Pmud), by means of an acquisition interface. Measurement procedure. The experiments are carried out according to the following phases:

Consolidation

The sample of claystone is brought to the desired temperature and pressure conditions; in our case, this is maintained for 2 days at a temperature of 80° C. a confinement pressure of 200 bars, a pressure in the pore circuit, containing simulated pore fluid, of 100 bars under static conditions and a pressure in the drilling fluid circuit, which in this phase contains simulated pore fluid, of 100 bars under flow conditions.

Evaluation of the Drilling Fluid

The pore fluid, circulating in the mud circuit, is changed over with test fluid (formulated with salts or with salts and clay inhibitor additives). When all the pore fluid circulating in the mud circuit has been replaced by test fluid, the pressure in the mud circuit is raised and is maintained constant for the whole duration of the test. The effectiveness of the test fluid in preventing pressure transmission from the mud to the shale, is evaluated by the pressure trend in the pore circuit over a period of time and in particular by its equilibrium value.

THE FOLLOWING EXAMPLES ARE PROVIDED FOR A BETTER UNDERSTANDING OF THE PRESENT INVENTION.

EXAMPLE 1

A formulation for a water-based fluid was evaluated, which was produced with the intention of preparing a formulation capable of blocking the shale pores (oil in water emulsion) and thus limiting pressure transmission from the mud to the formation. FIG. 1 indicates a pressure transmission experiment with an emulsion consisting of a paraffinic oil (Soltrol) at 10% w/w, a surface-active agent (Tween 85) at 5% w/w and potassium chloride at 5% w/w. Starting from equilibrium conditions between the pore and mud pressure, the pressure of the mud was increased three times with a pressure increase of 20 bars each time. It was observed that the first pressure increase of the mud does not cause any pressure increase of the pores, the second pressure increase of a further 20 bars causes an increase of about 5 bars in the pore pressure (ΔP=35 bars) and finally the last pressure increase, for a total of 60 bars difference, causes an increase in the pore pressure until a pressure difference between mud and pores equal to about 35 bars, is reached.

FIG. 1 demonstrates how, with a considerable increase in the mud pressure, there is only a slight increase in the pressure of the formation fluids.

Comparative Example

The result is given of a pressure transmission test obtained with a commercial glycol with cloud point. According to literature, the glycol in question is soluble in the water-based drilling fluid below cloud point, whereas it separates forming micro-drops at a higher temperature. These micro-drops should be capable of blocking claystone pores, thus preventing pressure transmission from the mud column to the formation.

An aqueous solution was prepared at 5% by weight of commercial glycol with a cloud point equal to about 50° C. The test was carried out ensuring that the internal temperature of the pressurization cell of the test-sample was higher than the cloud-point.

Figure 2:
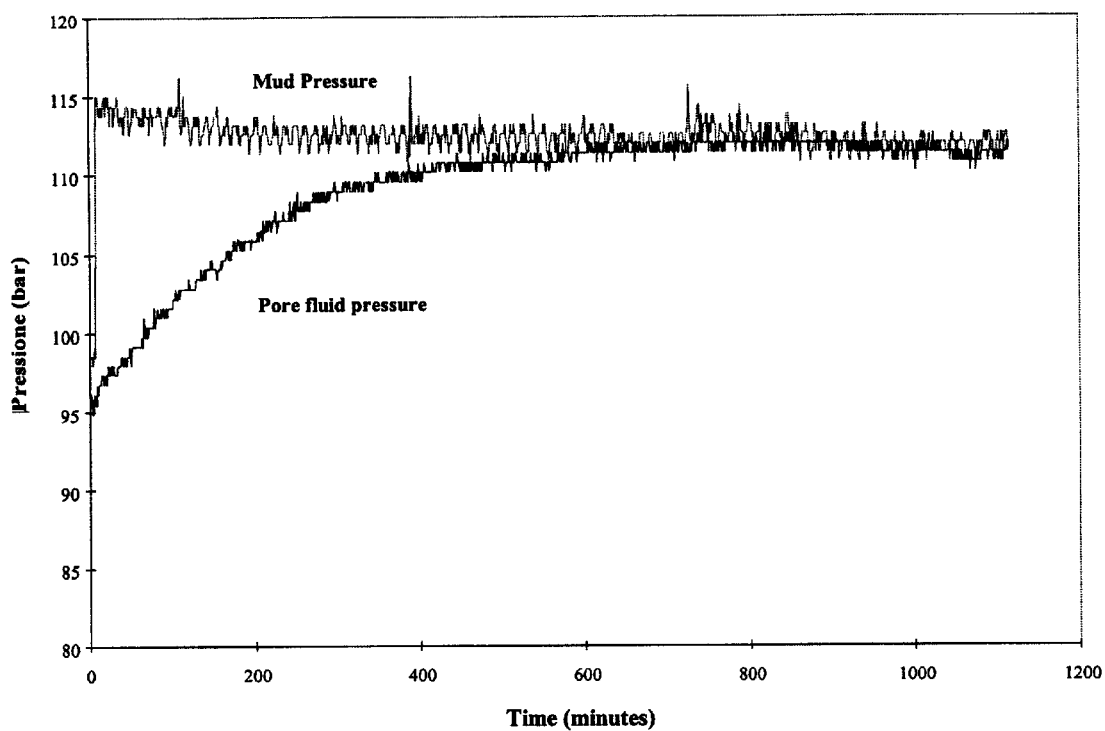

From FIG. 2, it can be observed that the solution of glycol with cloud point was not capable of blocking the pressure transmission from the mud to the formation; after about 10 hours the pressure of the pore fluid reached the mud pressure.

What is claimed is:

1. A process comprising blocking the micropores of shales with a drilling fluid comprising an oil-in-water emulsion prepared with polyoxyethylenesorbitan mono-oleate as an emulsifying agent which is present in a quantity from 2% to 10% by weight of the drilling fluid.

2. The process according to claims 1, wherein the drilling fluid comprises an essentially hydrocarbon oil insoluble in water in a quantity from 5% to 25% by weight of the drilling fluid.

3. The process according to claim 1, wherein the drilling fluid comprises an essentially hydrocarbon oil insoluble in water in a quantity from 8% to 15% by weight of the drilling fluid.

4. The process according to claim 1, wherein the polyoxyethylene-sorbitan mono-oleate is present in a quantity from 3% to 7% by weight of the drilling fluid.

5. The process according to claim 1, wherein the oil-in-water emulsion further comprises potassium chloride.

6. The process according to claim 1, wherein the shales are claystone.

7. The process according to claim 1, wherein the oil-in-water emulsion further comprises one or more viscosifiers.

8. The process according to claim 1, wherein the oil-in-water emulsion further comprises one or more lubricants.

9. The process according to claim 1, wherein the oil-in-water emulsion further comprises one or more biocides.

10. The process according to claim 1, wherein the oil-in-water emulsion further comprises one or more pH-regulators.

11. The process according to claim 1, wherein the oil-in-water emulsion further comprises one or more filtrate reducers.

12. The process according to claim 1, wherein the drilling fluid comprises a paraffinic hydrocarbon oil.

* * * * *